United States Patent
Nielsen et al.

(10) Patent No.: US 9,578,894 B2
(45) Date of Patent: Feb. 28, 2017

(54) TUNNEL PASTEURIZER

(75) Inventors: Jorgen T. Nielsen, Alsgarde (DK); Kim C. Dalum, Rungsted Kyst (DK)

(73) Assignee: KRONES AG, Neutraubling (DE)

( * ) Notice: Subject to any disclaimer, the term of this patent is extended or adjusted under 35 U.S.C. 154(b) by 1994 days.

(21) Appl. No.: 11/917,659

(22) PCT Filed: Jun. 14, 2006

(86) PCT No.: PCT/EP2006/005740
§ 371 (c)(1),
(2), (4) Date: Jul. 23, 2009

(87) PCT Pub. No.: WO2007/101455
PCT Pub. Date: Sep. 13, 2007

(65) Prior Publication Data
US 2009/0280222 A1    Nov. 12, 2009

(30) Foreign Application Priority Data
Jun. 17, 2005 (DE) .......................... 10 2005 028 195

(51) Int. Cl.
A23L 3/02 (2006.01)
A23L 3/00 (2006.01)
A23L 3/04 (2006.01)

(52) U.S. Cl.
CPC .................. *A23L 3/02* (2013.01); *A23L 3/003* (2013.01); *A23L 3/04* (2013.01)

(58) Field of Classification Search
CPC . A23L 3/02; A23L 3/003; A23L 3/004; A23L 3/12; A61L 2202/23

(Continued)

(56) References Cited

U.S. PATENT DOCUMENTS 4,331,629 A * 5/1982 Huling ............................ 422/25
4,441,406 A   4/1984 Becker et al.
(Continued)

FOREIGN PATENT DOCUMENTS

| EP | 0960574 | 12/1999 |
|----|---------|---------|
| GB | 319742 | * 7/1930 |
| WO | WO-9522352 | 8/1995 |

OTHER PUBLICATIONS

PCT International Preliminary Report on Patentability; International Application No. PCT/EP2006/005740; International Filing Date: Jun. 14, 2006; Date of Mailing: Dec. 17, 2007 (with English translation).

*Primary Examiner* — Viren Thakur
(74) *Attorney, Agent, or Firm* — Marshall, Gerstein & Borun LLP (57) ABSTRACT

A tunnel pasteurizer having a tunnel, through which the material to be pasteurized is conducted and sprayed or sprinkled with water, and with a trap region for the draining water arranged on the bottom of the tunnel, pasteurizer and a plurality of temperature zones arranged in the transport direction, and the trap region is divided into separate trap zones which correspond to the temperature zones, from which the water is re-supplied to the respective tunnel zones, and comprising a control means for controlling the water temperature in the temperature zones. To improve control of the temperature in the individual temperature zones, the control and the tubing of the trap zones is adapted such that water can selectively be taken from the individual trap zones for temperature control and can selectively be returned to other temperature zones, wherein water is buffered in the individual temperature zones separate from other temperature zones in a respective zone buffer.

11 Claims, 9 Drawing Sheets

(58) Field of Classification Search
USPC .......... 426/407, 521; 99/361, 362, 367, 483;
422/3, 26, 905
See application file for complete search history.

(56) References Cited

U.S. PATENT DOCUMENTS

| | | | |
|---|---|---|---|
| 4,693,902 A | | 9/1987 | Richmond et al. |
| 4,704,958 A | * | 11/1987 | Braymand ....................... 99/470 |
| 5,750,174 A | * | 5/1998 | Lucassen ........................ 99/470 |
| 5,772,958 A | | 6/1998 | Nielsen |
| 6,352,021 B1 | * | 3/2002 | Panella et al. ................... 99/468 |
| 6,374,575 B1 | * | 4/2002 | Strohn et al. ................... 53/288 |
| 6,834,473 B2 | * | 12/2004 | Wiedemann .................... 53/127 |
| 2002/0031587 A1 | | 3/2002 | Panella et al. |
| 2002/0170440 A1 | * | 11/2002 | Wakabayashi et al. ........ 99/453 |

* cited by examiner

TUNNEL PASTEURIZER

CROSS-REFERENCE TO RELATED APPLICATION

The present application claims the benefit of priority of International Patent Application No. PCT/2006/005740 filed on Jun. 14, 2006, which application claims priority of German Patent Application No. 10 2005 028 195.8 filed Jun. 17, 2005. The entire text of the priority application is incorporated herein by reference in its entirety.

FIELD OF THE DISCLOSURE

The present disclosure refers to a tunnel pasteurizer, such as used in beverage bottling operations.

BACKGROUND

Figure 9:
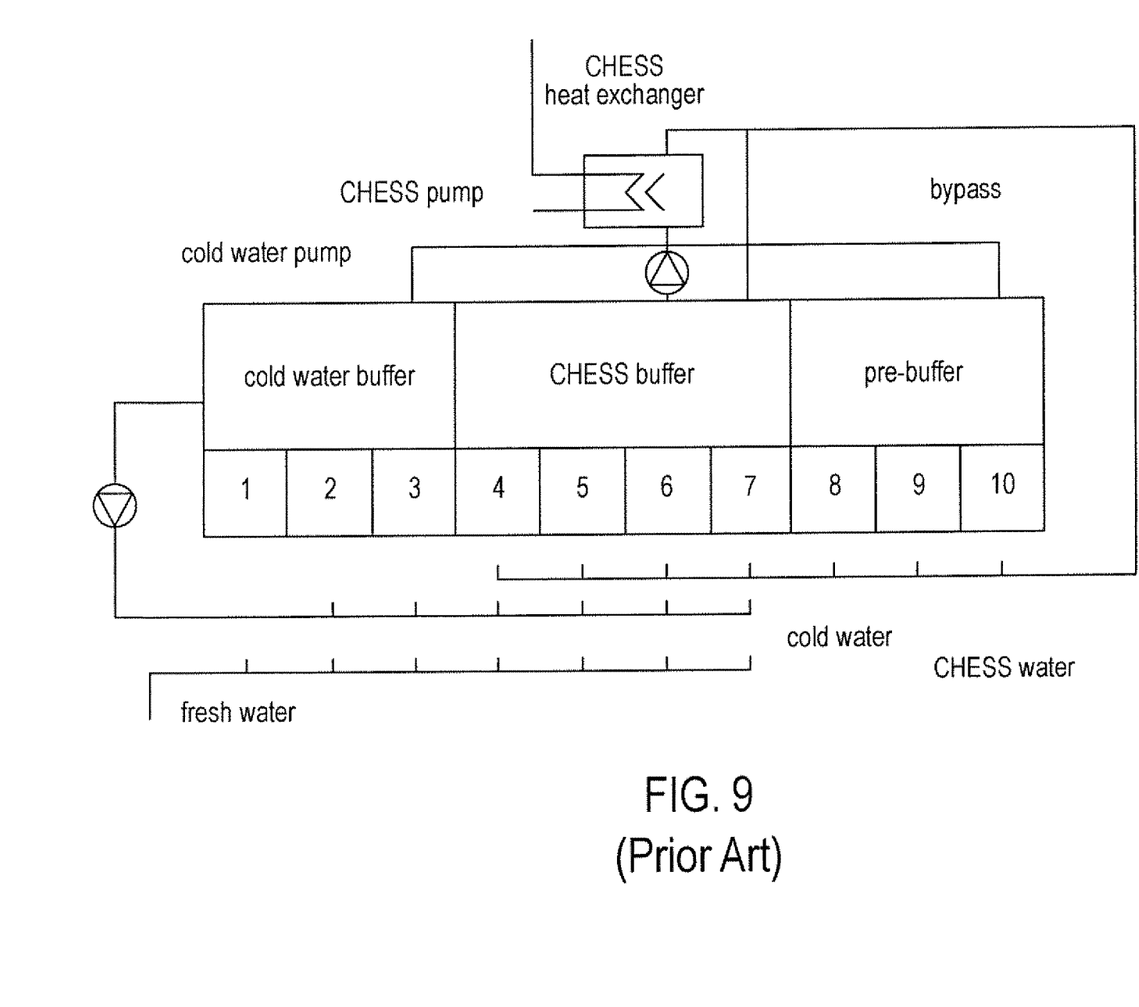
FIG. 9 shows the channel of a tunnel pasteurizer according to the prior art.

Such tunnel pasteurizers for filled food containers, particularly filled bottles and tins, are already known from the prior art, as also shown in FIG. 9. FIG. 9 shows a channel pasteurizer with an integrated heating system (U.S. Pat. No. 5772,958, EP 95909657.9) in the tunnel construction. The tunnel pasteurizer basically comprises two components, namely the channel shown in FIG. 9 and a tunnel arranged above the channel, which is not shown, said tunnel having spraying means and sprinkling means, which heat and pasteurize the material to be pasteurized that moves through the tunnel. Such a pasteurizer for instance comprises three heating zones (zone 1-3), in this case four stop zones (zone 4-7) and three cooling zones (8-10). The tempered water is pumped from the channel out of the zone chambers upwardly into the respective tunnel module of the respective temperature zone so that the material to be pasteurized is sprinkled with water of the respective temperature. Water heated by the heat exchanger is conducted into the Chess buffer. Water that flows from above into the very small dimensioned zone chambers 1-10 enters the respective buffer when the filling level is too high, i.e. it flows from the zone chambers 1-3 into the cold water buffers, from the zone chambers 4-7 into the Chess buffer and from the zone chambers 8-10 into the pre-buffer.

From there it can be re-used for regulating the temperature in the individual zone chambers.

However, the known system has the disadvantage that the temperature in the individual zone chambers cannot be regulated very precisely and the addition of fresh cold water is frequently required for a sufficient control, which, however, is inefficient. Above that, a very high volume must be held on a high temperature by the heat exchanger. Particularly in the case of production gaps, e.g. when a filler stops, the temperature in the individual zones cannot be regulated in an efficient manner. Such a system can also hardly take a change of the cooling water temperature into consideration. A delay in the temperature control often takes place.

A system is also already known in which water is conducted in a cascade-like manner through respective overflows e.g. from zone 1 to 2, from 2 to 3 etc. A precise control of the water temperature in the individual zones is also not possible.

Taking this into consideration, the present disclosure is based on the object of providing a tunnel pasteurizer and a respective pasteurization method which enables an improved control of the water temperature in the individual zones, wherein the water and energy consumption can be reduced.

SUMMARY OF THE DISCLOSURE

Figure 8:
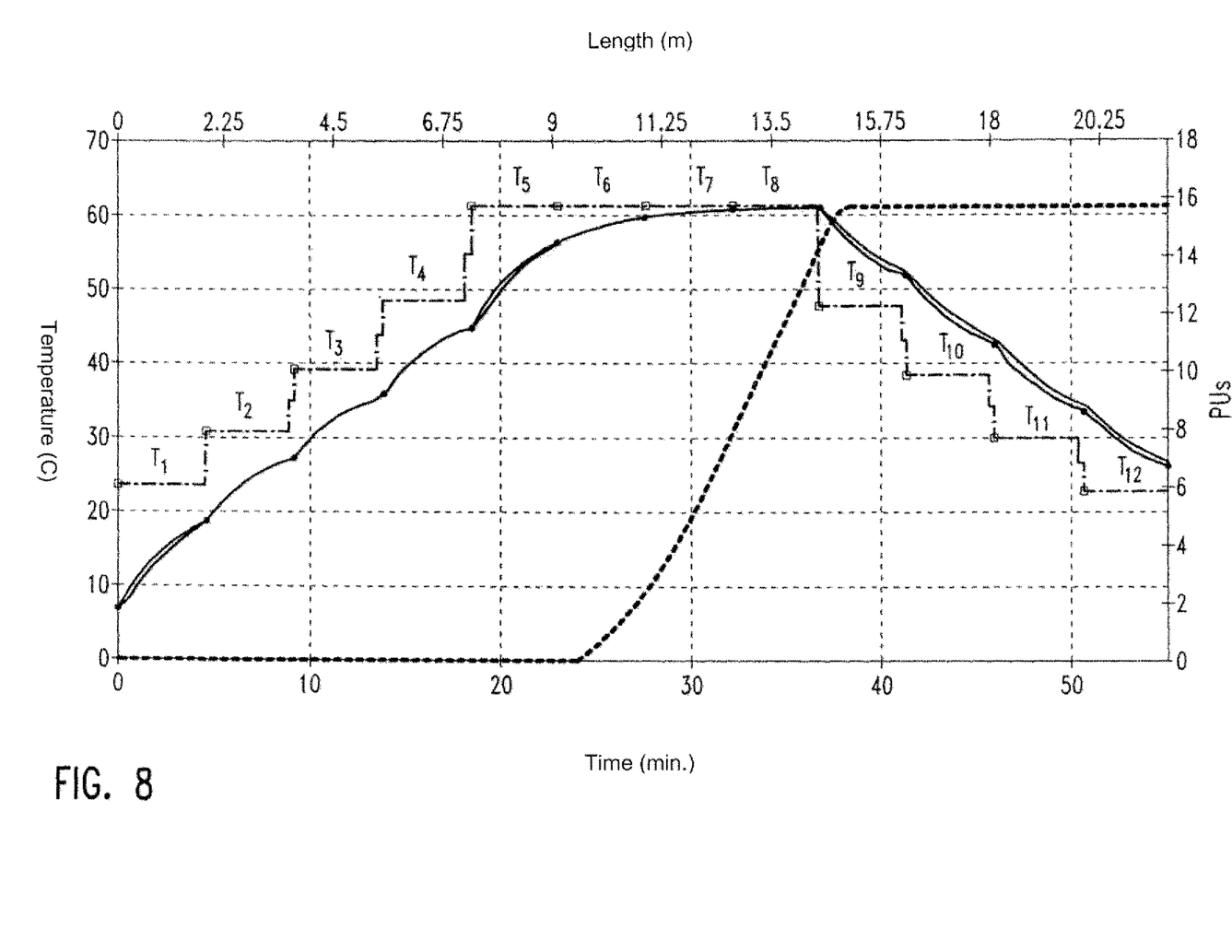
FIG. 8 shows a diagram which represents the heating temperature depending on the time.

According to the disclosure, individual temperature zones have their own individual zone buffers which are separate from zone buffers of other temperature zones. For the heating phase, stop phase and cooling phase, a plurality of individual temperature zones (see also FIG. 8) are provided, in which the water circulates at a predetermined temperature, i.e. the material to be pasteurized is sprayed or sprinkled, collected by the respective trap zone and is from there pumped upwards again into the tunnel in this temperature zone. The zone buffers are integrated in the respective temperature zone such that they only buffer water from the predetermined temperature zone without mixing water of other temperature zones. The water in the zone buffers therefore has a temperature corresponding substantially to the temperature of the associated temperature zone.

Due to the fact that according to the present disclosure water can selectively be taken from individual zone buffers separate from one another and can selectively be supplied to one or several temperature zones, water can be used from a predetermined temperature zone in an aimed manner for the temperature control of water of a further temperature zone. Contrary to the prior art, the water can be used in an aimed manner from the individual zone buffers without it being mixed with water from other zones. If for instance sufficient hot water exists in a zone buffer, it can be conducted in an aimed manner to a different temperature zone, e.g. in its trap zone or zone buffer etc., whose temperature is too low. Cooling water from a respective zone buffer of a temperature zone can either be conducted into the next or into any other temperature zone that has to be cooled. Thus, water and energy costs can be saved. A change of the cooling water temperature or production irregularities can simply be overcome. A delay in temperature control no longer exists.

The present disclosure is not restricted to the fact that all temperature zones have a zone buffer, which in the manner according to the disclosure is used for temperature control. It is also possible that only some temperature zones have separate zone buffers in a manner according to the disclosure, from which water is supplied to one or several predetermined temperature zones for temperature control.

It is also possible that water cannot be supplied to all temperature zones from the respective zone buffers.

Excessive water in the individual temperature zones is the water that exists in addition to the water that is required for circulation in the respective temperature zone and which has to be buffered. Such a buffer water or excessive water is for instance produced in that for controlling the water temperature, additional water is supplied to the individual temperature zones, which then exists in excess. According to the present disclosure, exactly this buffer water that has a precisely defined temperature, can be used for controlling the temperature in other temperature zones. Buffer water is also produced when the system stands still, i.e. when water no longer circulates.

It is possible that the volumes of all or individual trap zones are so large that the trap zones themselves serve as separate zone buffers for the excessive water in the respective temperature zones.

Since the trap zones are then formed as buffers for the water in the respective temperature zones, further buffer reservoirs for storing buffer water from the respective temperature zones are then no longer required. Thus, each temperature zone has its own buffer. The buffering of the water of the respective temperature zone and the provision of water according to a predetermined temperature zone then takes place in a trap zone, i.e. in the respective container. This arrangement significantly facilitates the tunnel pasteurizer.

It is also possible that the temperature zones have a buffer container connected to the respective trap zone, said buffer container serving together with the trap zone as a respective zone buffer.

According to a preferred embodiment, the water is pumped from the respective trap zone by a zone pump upwardly into the respective tunnel zone. The water serving for temperature control can at the same time be pumped through this pump out of the respective trap zone. By using the zone pump for pumping off the water for temperature control, the device can severely be simplified, since an additional tubing leading away from the trap zone is not required. The transfer of the water pumped off by the zone pump can be regulated through respective control valves.

A filling level meter and a temperature sensor is preferably associated to each zone buffer. Thus, the actual temperature in each zone buffer can be compared to the target temperature and above that the filling level, e.g. a minimal and a maximal filling level, can be determined, whereupon the control means determines in which zone buffer sufficient water of a predetermined temperature exists to control the temperature in the temperature zones, to prevent an overflow or to prevent a too low filling level (below a minimal filling level) so that the zone pump does not run dry.

According to a preferred embodiment, the tunnel pasteurizer comprises at least one cold water supply line and at least one hot water supply line, wherein the individual trap zones or zone buffers have a cold water supply and a hot water supply, wherein water is supplied for temperature control from the zone buffers via respective lines either to the cold water supply line or to the hot water supply line. If the tunnel pasteurizer has a heat exchanger, the water supplied to the hot water supply line can also first of all be conducted via a return line over the heat exchanger before it is conducted into the hot water supply line.

The above-mentioned arrangement allows a tubing at a minimal effort and minimal costs, since the structure for the temperature control substantially uses the tubes required for the circulation of the water. The solution according to the disclosure can therefore be realised in a space-saving and cost-effective manner, since only lines to respective hot water, cold water or return lines to the heat exchanger with respective valves and possibly buffer reservoirs for each temperature zone (if the trap zone does no serve as a zone buffer) have to be provided.

According to a preferred embodiment, a suction box is arranged below a trap zone. The zone pump pumps water via the suction box out of the trap zone, wherein the suction box is arranged on a first side of the tunnel pasteurizer and a valve tube is arranged on the opposite side and is connected via a tube with the zone pump, wherein at least one connecting tube branches off from the distributing tube upwardly into the respective tunnel, and the distributing tube is further connected via a line with the hot water supply line or a return line to the heat exchanger and/or via a line to the cold water supply line. This embodiment has the advantage that the tubes can be arranged in a space-saving manner underneath the tunnel pasteurizer, wherein the zone pump is arranged on one side and the distributing tube is arranged on the other side. The water can run in a simple manner into the suction box, wherein on the other side of the pasteurizer sufficient space for the distributing tube with the branching lines exists. The suction box provides a further liquid volume and can therefore also be regarded as being part of the zone buffer so that supply lines can for instance lead into the suction box or filling level sensors etc. can be arranged.

In an advantageous manner the zone buffers comprise a discharge through which when the filling level is too high water can be discharged so that the trap zones do not overflow. However, water can also, if required, be discharged into the cold water supply line or the hot water supply line or into the return line to the heat exchanger. The trap portion can be formed by several troughs separated by separation elements. However, several juxtaposed troughs can be connected to one another through a trap means arranged below the trough and can therefore act as a trap zone. Thus, a trap region can be pre-fabricated, wherein the zone width can then be adapted to the respective conditions.

The tunnel pasteurizer comprises a plurality of heating zones, a plurality of stop zones and a plurality of cooling zones, wherein trap zones in the heating and cooling portion, which have the same target temperature, are connected to one another via respective lines. Thus, the water which heats up at the end of the tunnel pasteurizer by the cooling of the heated material can be used for heating the material in the heating zones.

BRIEF DESCRIPTION OF THE DRAWINGS

The present disclosure will now be described with reference to the following Figures.

DETAILED DESCRIPTION

Figure 1:
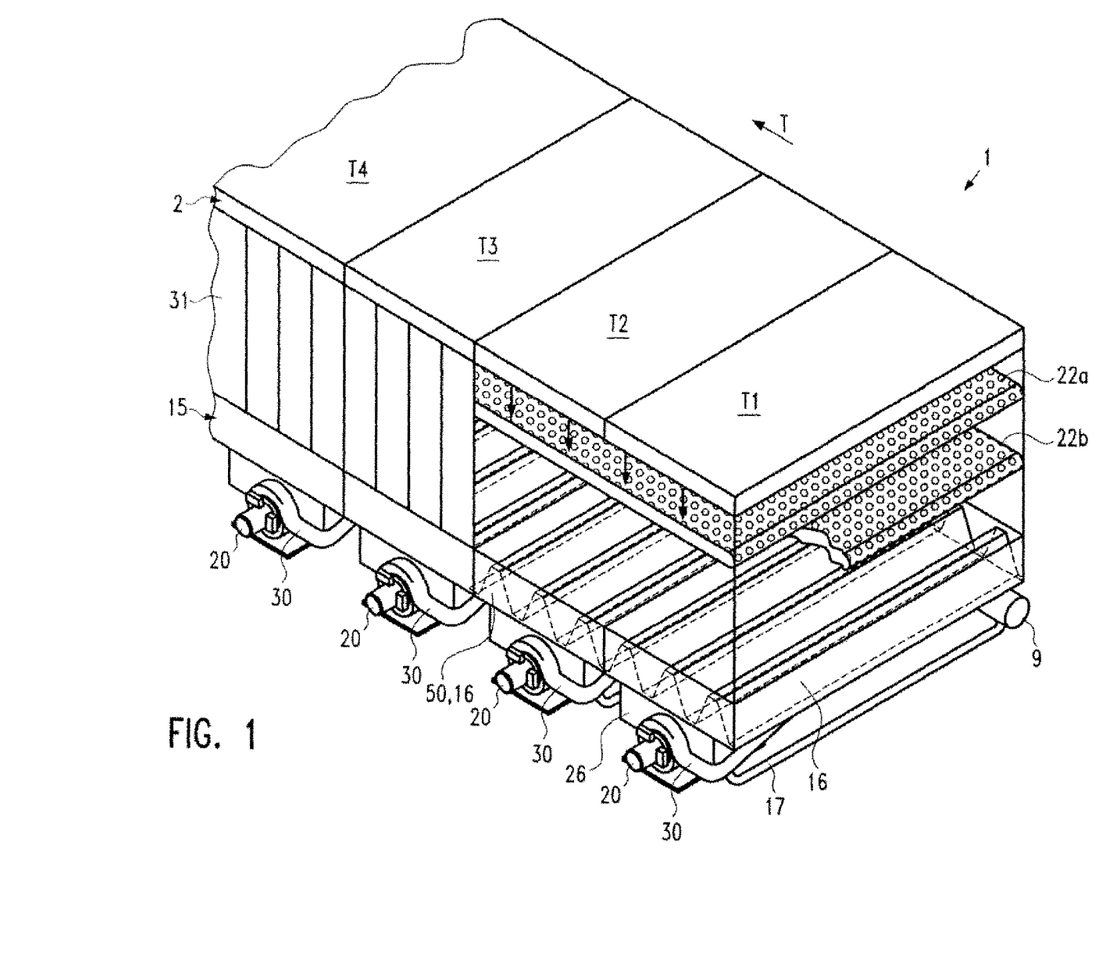
FIG. 1 shows in a perspective view a tunnel pasteurizer according to an embodiment of the present disclosure.

FIGS. 1 to 4 schematically show the structure of the tunnel pasteurizer 1 particularly for filled bottles according to the present disclosure. However, only 4 of the e.g. 12 temperature zones are shown in FIG. 1 for space reasons. As may be derived from FIGS. 1 and 2, the tunnel pasteurizer 1 has a tunnel 2, through which the material to be pasteurized is conducted and sprayed or sprinkled with water. The material to be pasteurized is conveyed on transport belts 22A, 22B arranged one above the other in the transport direction T through the tunnel 2. The transport means are in this case revolving perforated transport belts 22a, b. On the upper side of the tunnel 2 the water is conducted downwards through respective means to the material to be pasteurized in the direction of the arrow. On the bottom of the tunnel 2, the trap region 15 is arranged with trap zones 16 in which the draining water is collected and, as will be described further below, is conducted in a circulating manner via a respective line 27 (see FIG. 3) upwards in the tunnel 2 to be re-used. The side walls of the tunnel are for instance covered by glass pane doors (31) etc., as can be seen in the left half of FIG. 1.

The tunnel pasteurizer comprises a plurality of temperature zones $T_1$, $T_2$, $T_3$, $T_4$ . . . As may be seen from FIG. 8, the material to be pasteurized is first of all heated in four zones at a temperature of below 10° C. to approx. 60° C., wherein the temperature is kept on approx. 60° C. in four further zones. Then, the material to be pasteurized is cooled in four further zones to approx. 20 to 30° C. The lower continuous curve shows the temperature of the material to be pasteurized depending on the time, wherein the upper dot and dash line shows the temperature of the water in the individual temperature zones T1-T12 which are separated from one another. The dotted line shows the pasteurisation degree. The temperature in the different zones must therefore be regulated, as will be explained further below. Two to six heating zones, two to six stop zones and two to six cooling zones can be provided.

The tunnel pasteurizer can be structured modularly, i.e. a plurality of tunnel modules, which correspond to the temperature zones, can be joined to one another, as may be derived from FIG. 1. Respective trap zones 16 with a respective zone pump 20 and a respective tubing can modularly be associated on the bottom of the respective tunnel modules 2.

Each temperature zone or each module has, as mentioned above, a trap zone 16. According to the present disclosure, the width b (see FIG. 3) of the trap zone can be at least as broad as the width of the tunnel 2 according to an embodiment. The trap zone 16 traps the water draining in the tunnel and serves as a zone buffer 50 for the water in the respective temperature zones. That means that the water in the respective temperature zone, which exceeds the water quantity, is buffered in a circulating manner in the respective zone buffer 50. This buffer water or excessive water was for instance additionally conducted into the respective temperature zone for reasons of temperature regulation. That means that each temperature zone has its own separate zone buffer. In this embodiment the buffering of the water used in the zone and the provision of water takes place according to the predetermined zone temperature in a trap zone separate from the other trap zones, i.e. in a container or in a chamber without additional buffers etc. being required.

However, it is also possible that the individual temperature zones have a buffer container connected to the respective trap zone 16, wherein the trap zone and the respective buffer container represent the zone buffer. No matter how the zone buffer is structured, the essential feature is that the individual zone buffers of the individual temperature zones are formed independent of one another.

Figure 5A:
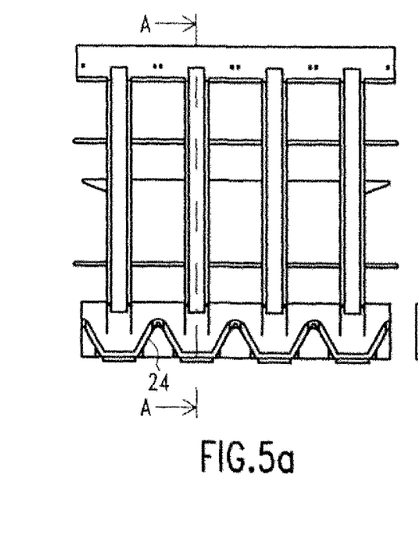
FIG. 5A shows a top plan view onto a zone of the tunnel pasteurizer according to the disclosure.
Figure 5B:
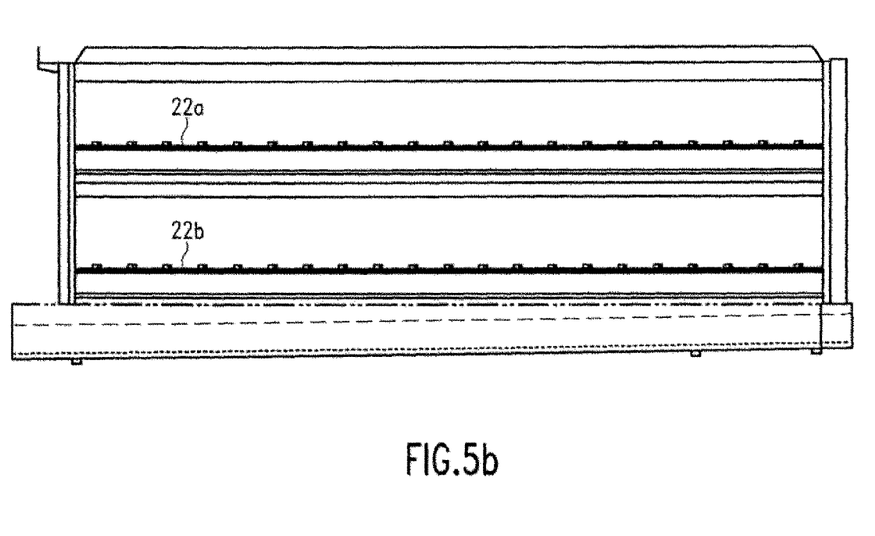
FIG. 5B shows a section along line AA of FIG. 5A.
Figure 5C:
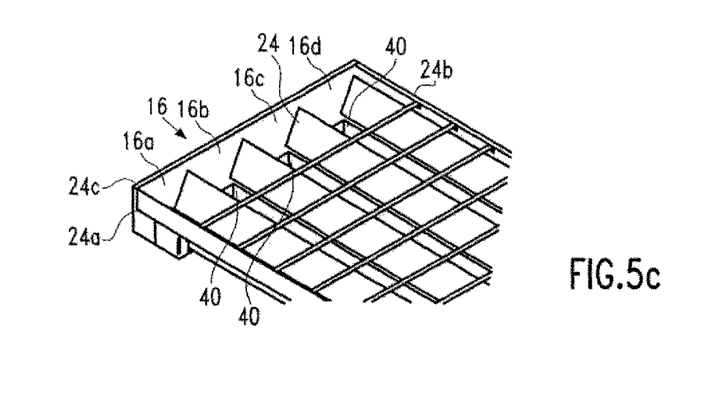
FIG. 5C shows the trap zone shown in FIG. 5A in perspective view.

FIG. 5A shows a top plan view onto a trap zone 16 and FIG. 5C shows a perspective view of this trap zone.

The trap zone 16 has a plurality of trough portions 16a, b, c, d, which are separated from one another by substantially triangular separation elements 24. The trough portions 16a, b, c, d have lateral separation walls 24a, b, c, d around their circumference, if they are formed as a module (the separation wall 24d opposing the separation wall 24c is not shown in Fig. 5C), whose height is slightly higher than the height of the triangular separation elements 24. To achieve that the trough portions 16a, b, c, d represent a trap zone, a collecting means (e.g. a pump box 26) is provided below the trap zone 16, through which the individual trough portions 16a, b, c, d are connected to one another, e.g. by respective openings 40 in the bottom portion of the individual trough portions 16a, b, c, d so that water can drain from all portions in the trap zone 16. In FIG. 5b the dotted line shows the filling level of the water in the zone buffer, i.e. of the trap zone during operation, the dashed line shows the maximum level during operation and the double dotted line shows the maximum filling level after a stop. The bottom of the trap zone 16 is slightly inclined towards the side of the pasteurizer 1 at which the zone pump 20 is arranged, and at which, as may be derived from FIG. 3, the trap means, in this case the suction box, is arranged. Thus, it is ensured that a complete emptying of the trap zone 16 after operation is possible.

Figure 3:
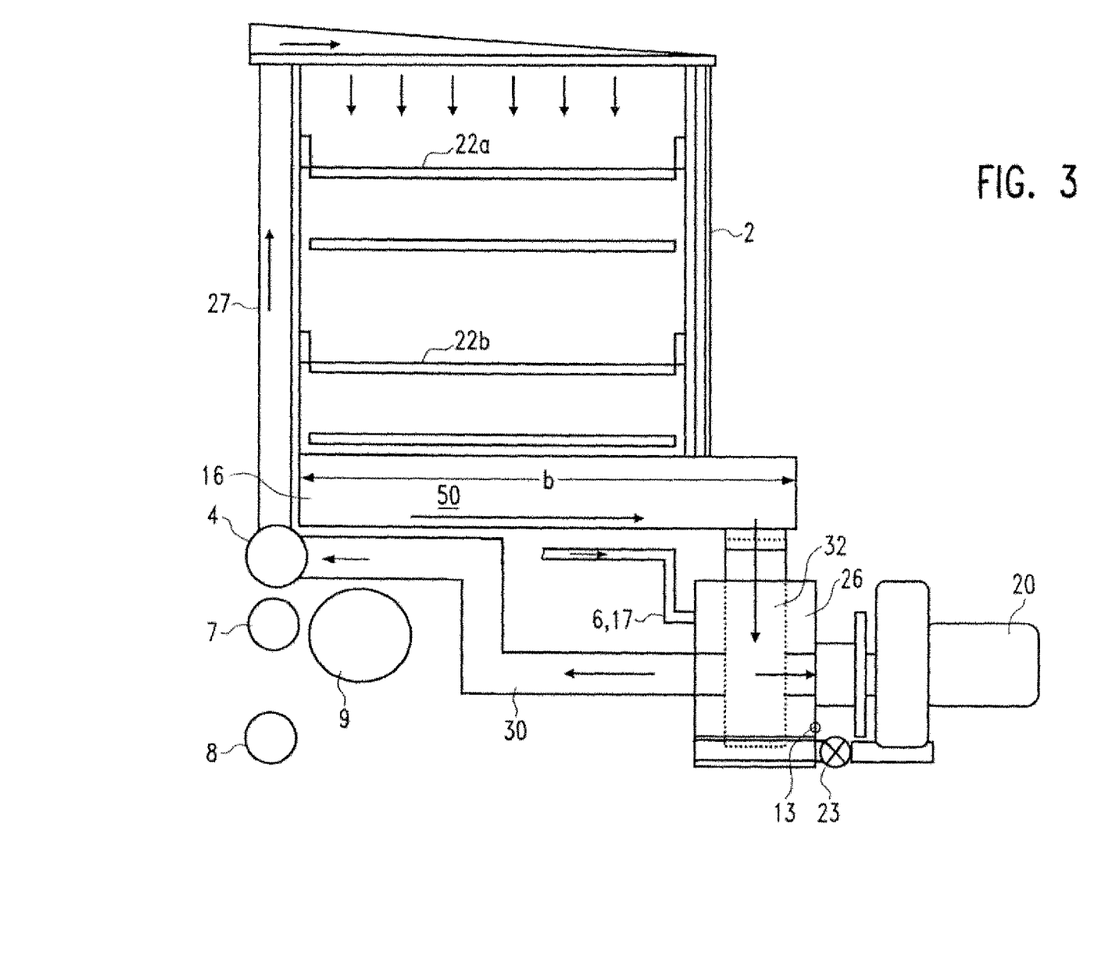
FIG. 3 shows in schematic view a cross-section through the tunnel pasteurizer according to the disclosure.

As may be seen from FIG. 5B and FIG. 3, the width b of the trap zone 16 in this embodiment is larger than the width of the tunnel so that the trap zone 16 projects over the tunnel 2.

On one side of the tunnel pasteurizer 1 of the front side shown in FIG. 1 and the right side shown in FIG. 3 a suction box 26 is provided for each temperature zone, into which the water from the trap zone 16 can flow. A zone pump is arranged on this suction box 26, said pump pumping the water via a line 30 into a distributing tube 4 which is located on the opposite side of the tunnel pasteurizer, i.e. on the rear side of the pasteurizer shown in FIG. 1 and on the left side in FIG. 3. A filter 3 can be provided in the suction box 26, said filter purifying the circulating water from impurities of the material to be pasteurized. A filling level sensor, e.g. a pressure sensor 13 can also be arranged in the suction box 26, through which said sensor the filling level is determined in the respective zone buffer or in the trap zone. As described, the water is pumped by the zone pump via the line 30 below the pasteurizer to the other side into a distributing tube 4. The hot water supply line 7 and the cold water supply line 8 are located on the side opposing the zone pump 20, said hot water supply line and cold water supply line extending in the transport direction T. The return line 9 to the heat exchanger is also located on this side (see in this respect also FIGS. 2 and 4). At least one, in this case three, tubes 27 branch off upwardly from the distributing tube 4 into the tunnel 2 of the respective temperature zone to conduct water upwardly for sprinkling the material to be pasteurized. As may be derived from FIGS. 2 and 4, the distributing tube 4 in FIG. 2 has a line 10a to the return line 9, which leads to the heat exchanger 18. Thus, hot water can be returned from the distributing tube back into the return line 19 to the heat exchanger 18, or, as may be derived from FIG. 4, via this return line 9 and the return line 9 back into the hot water line 7 to then be possibly supplied to other temperature zones. The structure shown in FIG. 2 corresponds to the structure in the temperature zone T6 in FIG. 4, i.e. in a stop zone in which hot water exists (zones T5 to T8). In the heating zones T1 to T4, in which substantially cold water exists, a line 10b leads from the distributing tube 4 into the cold water line 8, since in these zones mainly cold water exists, which can be supplied via the cold water line 8 for temperature regulation of other zones. See in this respect the dashed line 10b in FIG. 2. Even if not shown in this embodiment, a connection line 10a from the distributing tube 4 to the return line to the heat exchanger or a line to the hot water supply line 8 could be provided in temperature zones T1 to T4, i.e. in the heating zones. In the cooling zones 9 to 12, connection lines 10c from the distributing tube 4 to the hot water line 7 are provided (not shown in FIG. 2). It is essential that in the heating zones (T1 to T4) water can be conducted into the cold water line 8 for temperature regulation, water can be conducted from the stop zones (T5 to T8) into the return line to the heat exchanger 18 and water can be conducted from the cooling zones T9 to T12 from the trap zones into the hot water supply line or into the return line 9. As may be seen in FIG. 4, the water can be supplied via the return line 9 through the heat exchanger pump to the heat exchanger 18, which heats the water e.g. to a temperature of 75° to 85° and finally supplies it back to the hot water supply line 7. Via line 19 water can be supplied from the return line 9 also in a loop to the hot water supply line 7.

Figure 2:
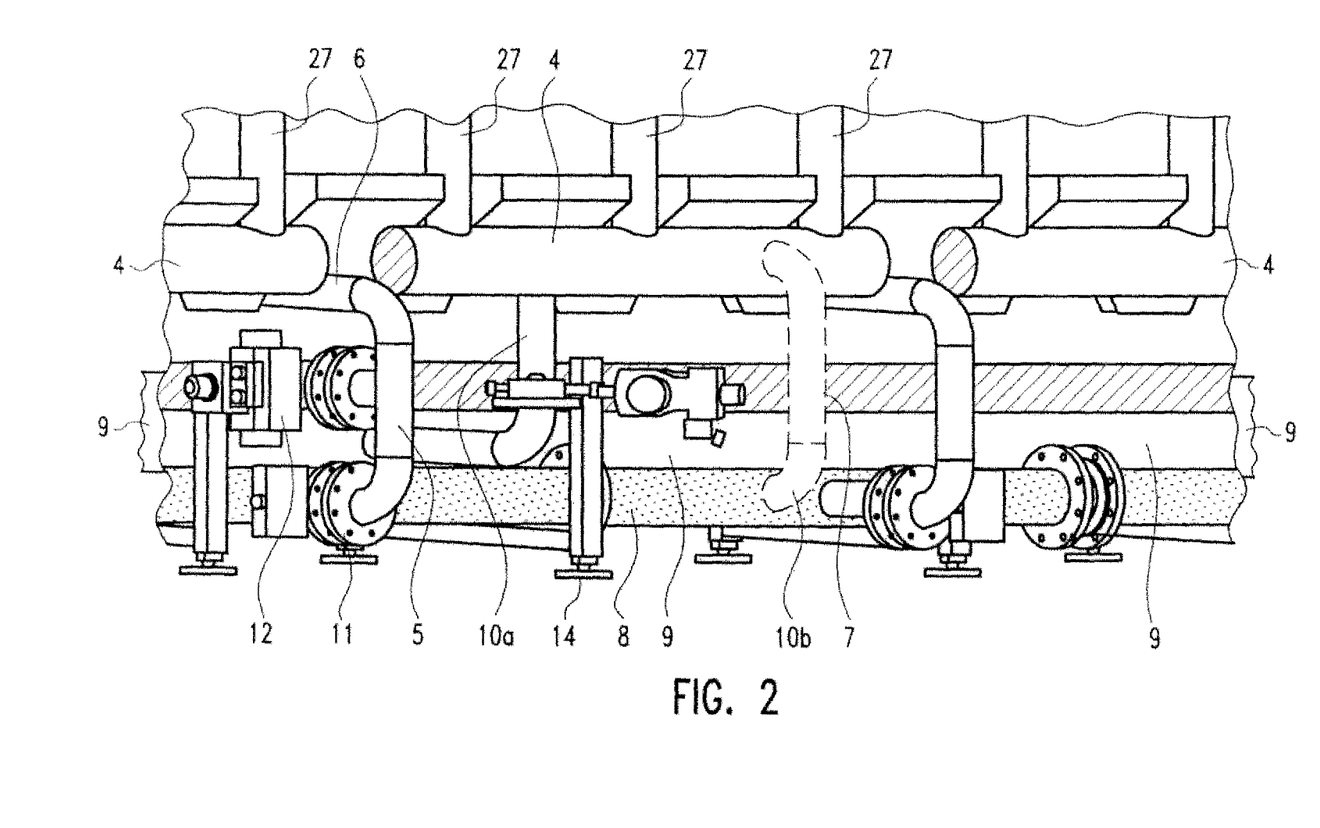
FIG. 2 shows a section from the tubing system of the tunnel pasteurizer according to the disclosure on the side opposing the side shown in FIG. 1.
Figure 4:
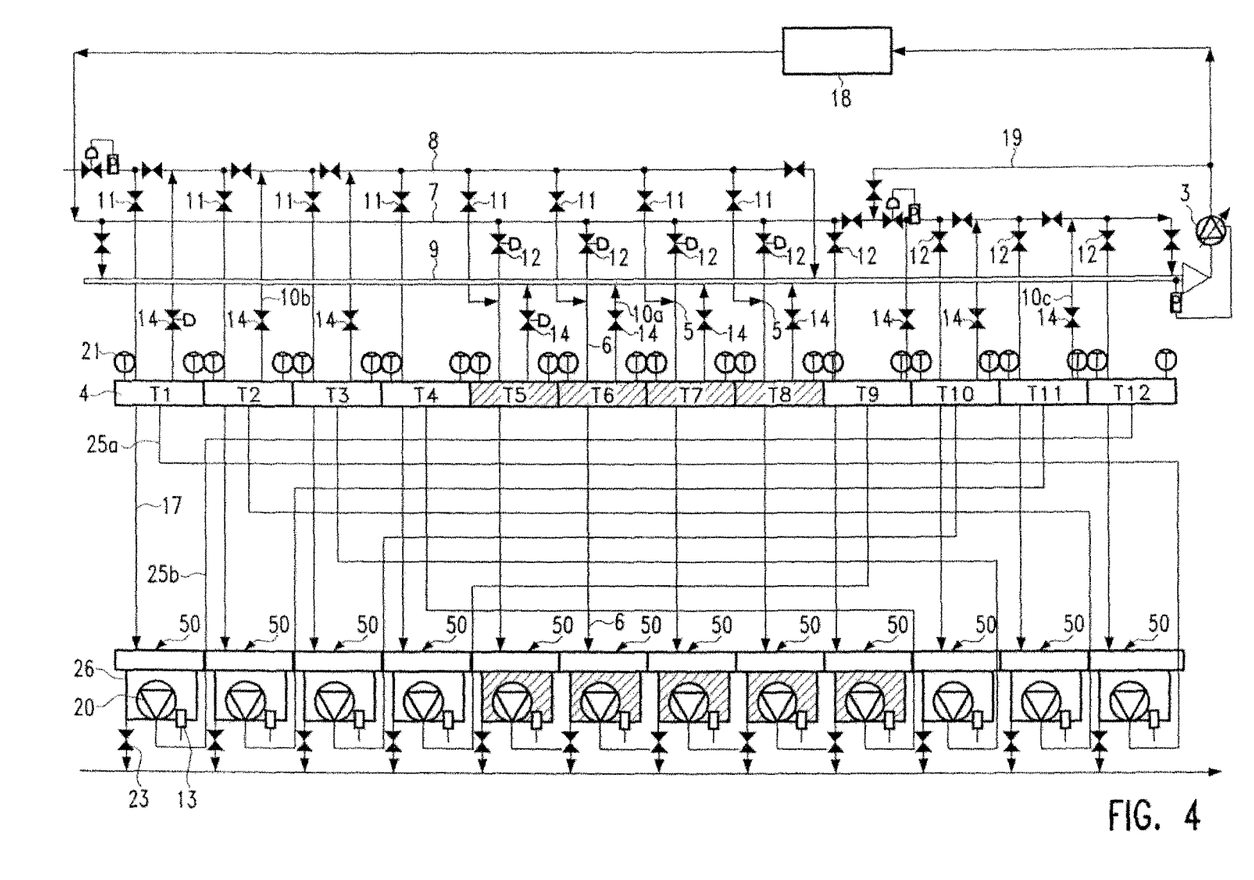
FIG. 4 show in a schematic view the tubing system of the tunnel pasteurizer.

Buffer control valves 14 are provided in lines 10a, b, c, each branching off from the distributing tube 4. These valves can be controlled by a control (not shown) and can be opened if water from the respective trap zones (16) or the associated distributing tube 4 is required for temperature regulation in the same or in a different trap zone 16.

As may further be derived from FIG. 4, each temperature zone has a cold water supply 17 and/or a hot water supply 6 from the respective supply lines, which open into the suction box 26. The supply is controlled by the control means, via respective cool water valves 11 and hot water valves 12. A branch 5 from the cold water supply into the hot water supply can also be provided. In this embodiment, the heating zones only have cold water supplies 17, which, as may be derived from FIG. 1, open into the suction box 26. This is caused by the fact that heating and cooling zones with the same target temperature are connected to one another via respective lines 25A, B, and the water therein is in exchange. As may be derived from FIG. 4, the distributing tube 4 in the temperature zone T1 is for instance connected to the suction box 26 of the last cooling stage T12, so that the water is in permanent exchange, so that the heat of the cooling material in the cooling phase (T9-T12) is used for heating in the heating phase (T1 to T4). In a similar manner, the zones T2 are connected to T11, T3 are connected to T10 and T4 are connected to T9. As may be derived from FIG. 4, a temperature sensor 21 is provided in the distributing tube 4, said sensor measuring the temperature of the water in the respective temperature zone. The temperature sensors can, however, also be arranged in the zone buffer 50, 16, the trap zone 16 or the suction box 26 or at any other position in the water cycle.

In the lower portion of the respective suction box 26 a discharge 23 is provided which, if the maximum filling level is detected through the filling level sensor 3 in the zone buffer, i.e. the trap zone 16, opens a discharge valve and thereby discharges water so that flooding in the respective trap zones does not occur.

In the method according to the disclosure, target temperatures for the individual temperature portions of the heating zone, the stop zone and the cooling zone are defined in the control means. The temperature of the water is detected via temperature sensors 21 in the respective temperature zones, i.e. in this case e.g. in the distributing tube 4. Furthermore, the filling level in the individual zone buffers, in the case the trap zones 16 is measured by respective filling level sensors 3. It is particularly determined whether the filling level exceeds a minimum filling level (which is required so that the water can circulate in the respective zone), i.e. whether buffer water exists in the respective trap zone or not. Moreover, the discharge valve 23 can be opened (or if needed it can be taken from the buffer discharge lines 10a, b, c) if it is detected by the filling level sensor 3 in a trap zone 16 that the filling level reaches a maximum filling level, so that flooding does not occur.

The temperatures of the water in the respective temperature zones measured by the sensors 21 are compared to the target value. If a deviation of the actual temperature from the target temperature occurs in a temperature zone, the control means detects via the signals of the temperature sensors 21, whether a temperature zone or trap zone 16 exists whose water has a suitable temperature that is suitable for temperature regulation, wherein it is assessed at the same time whether sufficient water exists above the minimum filling level in the respective trap zone 16, i.e. that sufficient buffer water exists in the respective trap zone, which, as described above, is assessed by the respective filling level sensors 13. If, as described above, a suitable trap zone 16 is detected, which has a suitable temperature and a sufficient filling level, the buffer valve 14 associated to this trap zone is opened by the control so that the water can be supplied from the respective trap zone 16 via the zone pump 20 when the valve 14 is open either to the cold water line 8, the hot water line 7 or the return line 9 to be then supplied from these lines via the respective cold water supply lines 17 or hot water supply lines 6 to another temperature zone. For this purpose the respective hot or cold water valves 11 or 12 are opened. In this embodiment the cold water supply and the hot water supply 6 is supplied to the respective suction box 26. The warm and cold water can, however, also be added at a different position in the water cycle of the respective temperature zone. Of course, the amount of water that is discharged via the buffer discharge lines 10a, b does not lead to the minimal filling level being too low.

Figure 6:
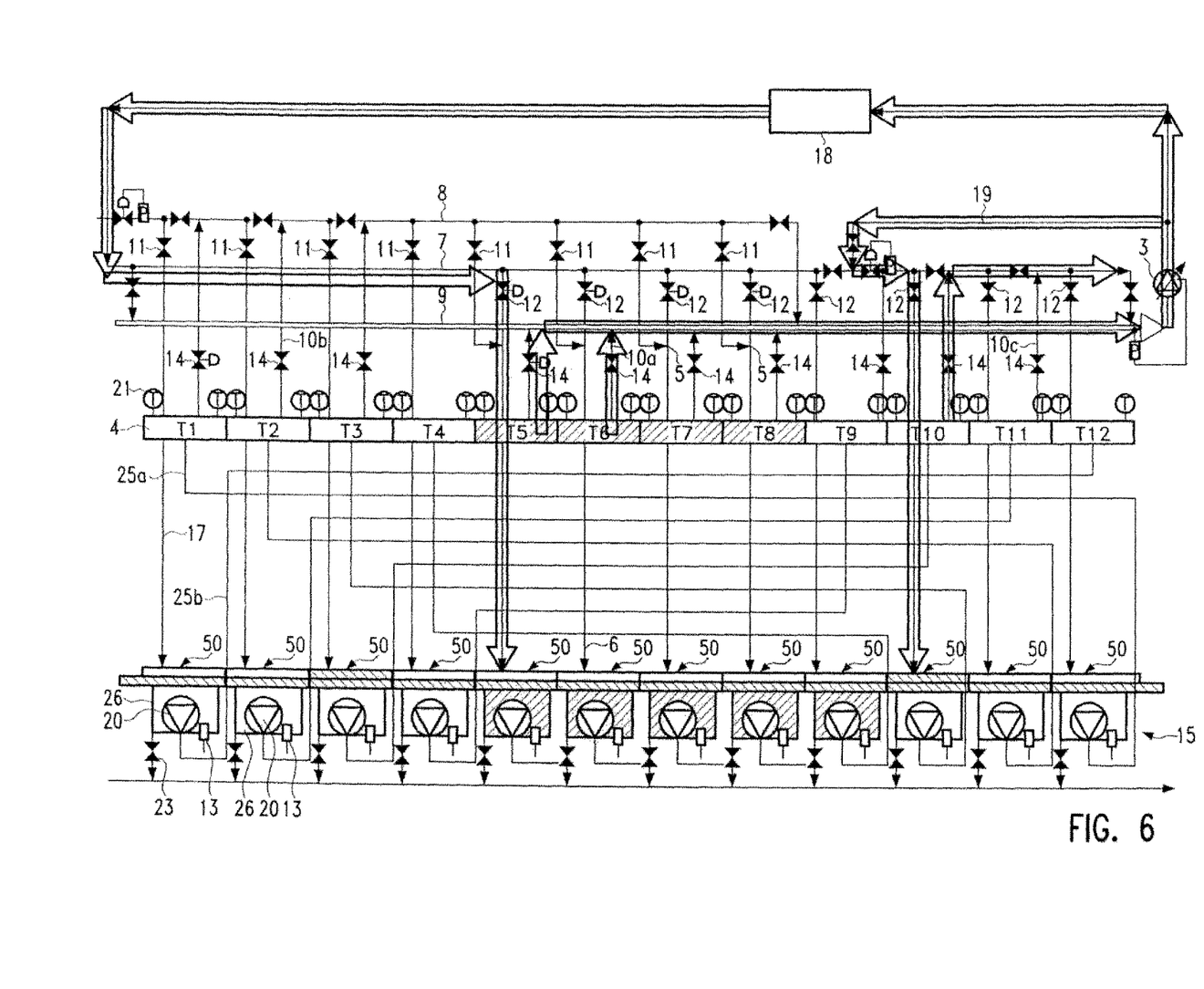
FIG. 6 shows a flow chart for the case that zones 5 and 10 are heated.

FIG. 6 shows an example or the temperature regulation in the temperature zones T5 and T10. The control means detect that the temperature in the temperature zone T5 is too low. It was detected by the filling level sensor that in temperature zones T5 and T6 a sufficient amount of buffer water exists, i.e. buffer water exceeding a minimum filling level. The temperature in the temperature zones T5 and T6 of the water is the highest in this case. Thus, the control opens the respective control valves 14 in the temperature zones T5 and T6 and conducts water from the respective trap zones 16, via the zone pumps 20, the opened valves 14, into the return line 9, which pumps the water via the heat exchanger pump 3 into the heat exchanger 18, which heats the water to a respective temperature, whereupon the hot water valve 12 in zone T5 is opened and hot water of the temperature zone T5 is conducted into the suction box 26. Hot water is supplied until the actual temperature measured by the temperature sensor 21 in the temperature zone T5 corresponds to the target temperature.

At the same time, the control detects that the temperature is also too low in temperature zone T10. Since the filling level meter 13 in the temperature zone T10 has detected a high level (the temperature zone T3, which is connected via lines 25a, b to the temperature zone T10, also has a high level) the buffer control valve 14 is opened and water from the trap zone 16 is supplied via the respective zone pump 20 and via the opened valve 14 to the hot water line 7, wherein a part of the water is supplied via the heat exchanger pump 3 to the heat exchanger 18, and a part of the water is returned via the return line 19 to the hot water supply line 7, wherein hot water is supplied via the hot water supply line 7 of temperature zone T10 until the target temperature is reached.

Figure 7:
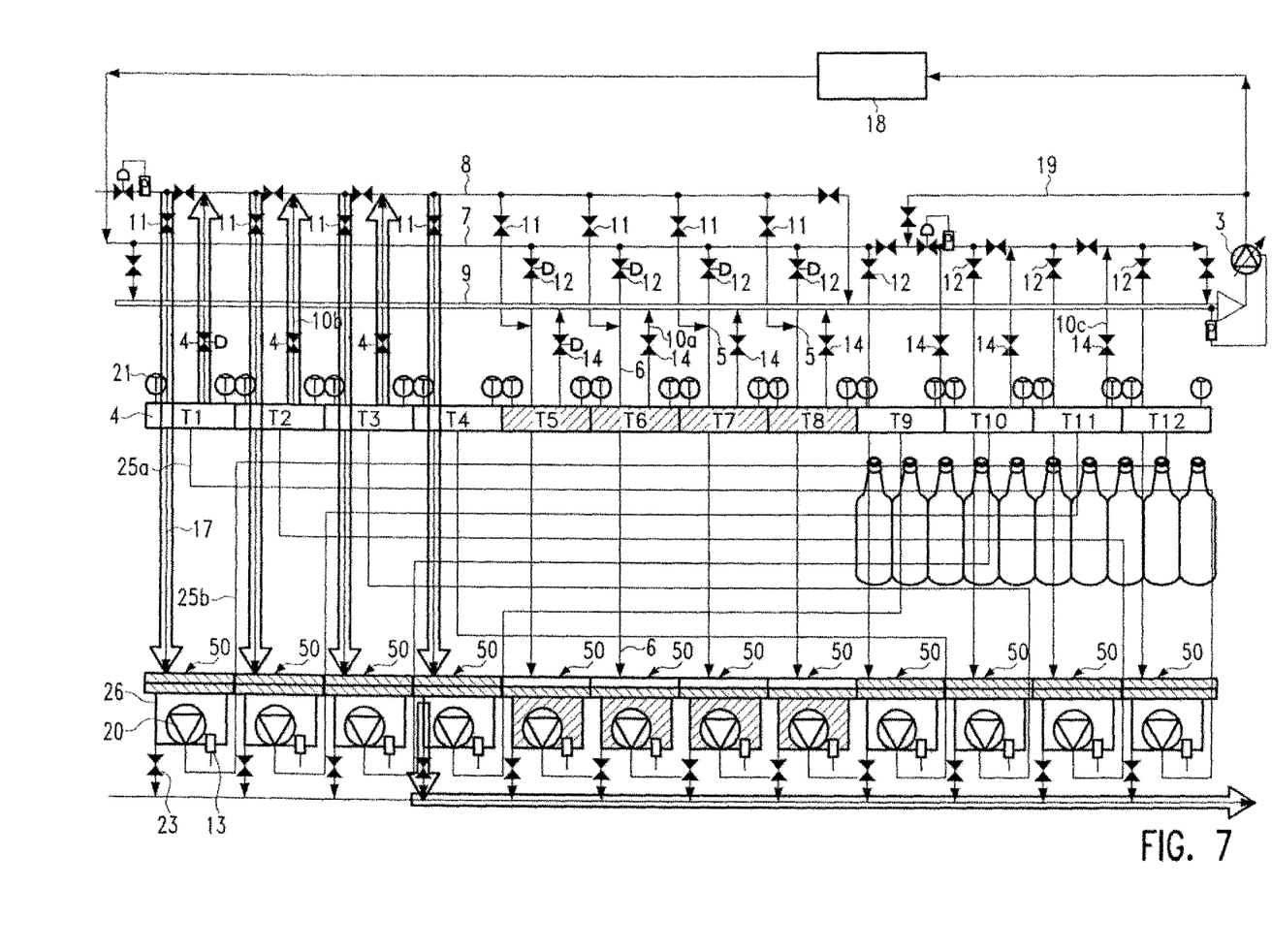
FIG. 7 shows a flow chart for the case that temperature zones T1 to T4 shall be cooled.

FIG. 7 shows a further example for the method according to the disclosure. If, for instance, a product gap occurs, so that articles no to be pasteurized, such as bottles, enter the heating zone T1 to T4, a heating no longer takes place. To maintain a balance between the heating zones and the cooling zones, the heating zones have to be cooled in that cold water is added via the line 17 of the temperature zone T1 to reach the respective target temperature. Since additional fresh water is added, the level in the trap zone 16 in zone T1 increases, which can be measured by the filling level sensor 3 in this temperature zone. The temperature zone T2, in which for instance bottles are no longer located, must additionally be cooled for maintaining the balance between the temperature zones T2 and T11, i.e. between the temperature zones in the heating and in the cooling zone with the same target temperature. Since a sufficient amount of cold water is located in the trap zone 16 in zone T1, the valve 14 in temperature zone T1 is opened, so that water can be supplied to the cold water line 8 from the trap zone 16 in the temperature zone T1 via the respective zone pump 20 through the distributing tube 4 through the opened valve 14 and can be supplied from there via the respective supply line 17 in the temperature zone T2 when the cold water valve 11 is open. In the same manner water is conducted from the trap zones 16 in the temperature zones T2, T3 into the cold water line 8, to be supplied to the following temperature zones. A supply from individual temperature zones to other temperature zones takes place until the respective target temperature in the respective temperature zones has been reached.

Caused by the fact that the trap zones 16 arranged below the tunnel zones act as zone buffers and the tubing of the trap zones 16, as shown in FIG. 1-4, is adapted such that for temperature regulation water can selectively be taken from the individual separate trap zones 16 and can selectively be supplied in an aimed manner to other temperature zones, the required water quantity and energy quantity can significantly be reduced and the water temperature can be regulated precisely.

The embodiments described have shown tunnel pasteurizers in which each temperature zone has a zone buffer. However, it is also possible that not all zones have a separate zone buffer for temperature regulation or that water cannot be supplied from the zone buffers to all temperature zones.

The invention claimed is:

1. A pasteurizing method, comprising:
conducting material to be pasteurized through a plurality of temperature zones of a tunnel and spraying or sprinkling the material with water,
collecting draining water in a trap portion arranged on the bottom of the tunnel in different trap zones that correspond to the plurality of temperature zones of the tunnel, and
re-collecting the water from the trap zones upwards into the tunnel of the respective temperature zones, wherein the temperature of the water in the temperature zones is regulated by a control unit,
wherein regulating the temperature of the water in the temperature zones by the control unit comprises:
buffering excessive water in zone buffers of a plurality of individual temperature zones from among the plurality of temperature zones of the tunnel,
each of the plurality of individual temperature zones having its own zone buffer, separate from other temperature zones, and
wherein excessive water in each of the plurality of individual temperature zones is water above a minimum filling level of the respective zone buffer, the water up to the minimum filling level being required for circulation in the respective individual temperature zone,
measuring by temperature sensors the temperature of the water in each of the plurality of temperature zones of the tunnel and comparing the measured temperatures with predetermined target temperatures,
determining, using the control unit, for each of the plurality of temperature zones of the tunnel whether the respective measured temperature deviates from a respective predetermined target temperature, and
regulating the temperature of the water in a first temperature zone from among the plurality of temperature zones of the tunnel upon determination that the respective measured temperature deviates from the respective predetermined target temperature;
wherein regulating the temperature of the water in the first temperature zone comprises:
determining using the control unit a plurality of candidate temperature zones from among the plurality of individual temperature zones, each of the plurality of candidate temperature zones being connected to the first temperature zone in such a way that buffered excessive water can be taken from the respective zone buffer of the candidate temperature zone and supplied to the first temperature zone without being mixed with water from another candidate temperature zone;
measuring by filling level sensors a filling level of each of the zone buffers of the plurality of candidate temperature zones; and
selectively choosing using the control unit one of the plurality of candidate temperature zones based on the measured temperatures and filling levels for the plurality of candidate temperature zones;
pumping buffered excessive water from the zone buffer of the selected candidate temperature zone using a zone pump associated with the zone buffer of the selected candidate temperature zone, and
supplying such buffered excessive water directly to the first temperature zone in order to regulate the temperature of the water in the first temperature zone;
wherein selectively choosing one of the plurality of candidate temperature zones comprises determining using the control unit that the measured temperature of the water of the selected candidate temperature zone is suitable for regulating the temperature of the water in the first temperature zone and determining using the control unit that the measured filling level of the zone buffer of the selected candidate temperature zone is above the minimum filling level of the zone buffer of the selected candidate temperature zone.

2. The pasteurizing method according to claim 1, wherein the zone buffer of a temperature zone comprises the respective trap zone and/or a buffer container connected to the respective trap zone.

3. The pasteurizing method according to claim 2, and pumping water, to control the temperature in the first temperature zone, from the trap zone of the selected candidate temperature zone via the respective zone pump into one of a return line to a heat exchanger, a cold water supply line, and a hot water supply line.

4. The pasteurizing method according to claim 2, and determining whether a filling level is above a predetermined maximum filling level in one or more of the zone buffers of the plurality of individual temperatures zones, and discharging water to a drain or into one of a return line to a heat exchanger, a cold water supply line, and a hot water supply line such that flooding in the respective zone buffer does not occur.

5. The pasteurizing method according to claim 1, wherein the water is supplied to a zone buffer of the first temperature zone, from which the water is conducted into the tunnel.

6. The pasteurizing method according to claim 3,
wherein the plurality of candidate temperature zones comprise heating zones, wherein the first temperature zone is a pasteurization zone or a cooling zone, and wherein the water is supplied to the first temperature zone via at least the cold water supply line.

7. The pasteurizing method according to claim 3, wherein the plurality of candidate temperature zones comprise pasteurization zones, wherein the first temperature zone is a pasteurization zone or a heating zone, and wherein the water is supplied to the first temperature zone via at least the return line to the heat exchanger and the hot water supply line.

8. The pasteurizing method according to claim 3, wherein the plurality of candidate temperature zones comprise cooling zones, wherein the first temperature zone is a pasteurization zone or a heating zone, and wherein the water is supplied to the first temperature zone via at least the hot water supply line.

9. The pasteurizing method according to claim 1, wherein the zone pump associated with the zone buffer of the selected candidate temperature zone pumps water from the zone buffer of the selected candidate temperature zone upwards into the tunnel of the selected candidate temperature zone and at the same time to the first temperature zone in order to regulate the temperature of the water in the first temperature zone.

10. The pasteurizing method according to claim 1, wherein each of the candidate temperature zones is connected via a respective connection line to a return line, each connection line comprising a respective buffer control valve for controlling water flow from the respective candidate temperature zone to the return line; and wherein selectively choosing one of the plurality of candidate temperature zones comprises opening the respective buffer control valve by means of the control unit.

11. The pasteurizing method according to claim 10, wherein the return line is connected to the zone buffer of the first temperature zone via a supply control valve; and wherein supplying the buffered excessive water to the first temperature zone comprises opening the supply control valve by means of the control unit.

* * * * *